United States Patent Office 3,667,980
Patented June 6, 1972

3,667,980
STRONG SALT FLOOR COMPRISING HALITE CRYSTALS, MAGNESIUM SULFATE AND POTASSIUM
Ulrich E. G. Neitzel and David S. Butts, Ogden, Utah, assignors to Great Salt Lake Minerals & Chemicals Corporation, New York, N.Y.
Filed Sept. 24, 1968, Ser. No. 761,961
Int. Cl. C08h 17/24
U.S. Cl. 106—286                                                       10 Claims

ABSTRACT OF THE DISCLOSURE

A reinforced, sodium chloride floor for a solar pond is developed. First, a brine is evaporated under conditions which deposit a sodium chloride layer, containing a high volume-percent of voids, on the pond bottom. The sodium chloride layer is then covered with brines of preselected compositions such that first hydrated magnesium sulfate and then additional sodium chloride is deposited in the voids. There results a floor which is stronger and more compact than sodium chloride floors developed by prior art methods.

RELATED APPLICATIONS

Commonly assigned co-pending application Ser. No. 735,840, filed June 10, 1968, discloses and claims a method whereby natural brines, such as those from the Great Salt Lake of Utah, are manipulated in a system of solar evaporation ponds to produce crystal crops of potassium salts. The present invention discloses and claims a method for producing a strong, compact floor in certain of the ponds to enable harvesting of the crystal crops by heavy equipment.

BACKGROUND OF THE INVENTION

Field

The present invention relates to harvesting crystal crops from solar evaporation ponds. It is particularly directed to producing a strong, compact floor for such ponds. Specifically, this invention teaches a method for providing a highly desirable, reinforced, sodium chloride floor for harvest ponds from which potassium salts are harvested.

State of the art

It is known to evaporate brines of various compositions in systems of solar evaporation ponds to produce desired crystal crop is being harvested, i.e., the "harvest pond." for sale or for further processing Efficient harvesting of the crystal crop normally involves the movement of heavy equipment across the floor of the pond from which the crystal crop is being harvested, i.e., the "harvest pond."

Solar evaporation ponds are normally constructed by diking earth. The walls and bottom of the ponds are thus of earthen construction. Earth materials are undesirable contaminants of the crystal product. Earthen floors are often unsuitable for carrying the heavy equipment used in harvesting. Thus, it is known to provide a sodium chloride floor for the pond to insulate the crystal product from the natural earth pond bottom and to provide sufficient strength an suitable surface for the support of heavy harvesting equipment. The heavier the equipment employed, the thicker and stronger the sodium chloride floor must be to avoid breaking.

Sodium chloride floors resulting from the natural evaporation of brines normally contain about 30 to 40 volume-percent voids. These voids are filled by entrained brine and tend to weaken the floor as well as to permit leakage of brine through the floors into the earth. To overcome the natural weakness of such a floor, the floor must be made very thick. Often 3 or more feet of sodium chloride are required to establish a useful floor.

It is well known that the evaporation rate of a brine saturated with NaCl, and consequently the precipitation rate of NaCl therefrom, decreases as the specific gravity of the brine increases. Accordingly, it is known that a maximum thickness of NaCl is deposited on the pond floor under evaporating conditions such that the specific gravity of the brine is maintained at a low value, i.e., is maintained under non-concentrating conditions by reason of continuous flow of brine into and out of the pond. Even under such conditions, however, production of a suitable sodium chloride floor may take several years. In the area of the Great Salt Lake of Utah, for example, preparation of a pond floor by the evaporative deposition of sodium chloride may require four years or more.

SUMMARY OF THE INVENTION

The present invention is directed to the production of a novel, compact, strong, and dense floor, which contains substantially no voids and consequently little or no entrained brine. The floor is much stronger than typical salt pond floors and provides an effective barrier against leakage from the pond. The procedures required to produce a satisfactory floor require the pond to be non-productive for only one evaporation season. A thicker floor may be produced, if desired, by repeating the sequence of steps taught by the present invention one or more times, but the floor produced by one complete sequence normally surpasses in strength and usefulness pond floors which require several years for development in accordance with the procedures of the prior art.

According to the present invention, a pond is constructed in conventional fashion and is then flooded with brine which is concentrated, preferably saturated, with NaCl. The brine is subjected to evaporation, preferably under concentrating conditions, i.e., without appreciable flow through the pond. As the brine evaporates, sodium chloride is deposited on the bottom of the pond. The crystallized NaCl contains a high volume-percent of voids filled with entrained brine. The brine entrained in each void initially has the approximate composition of the brine in the pond at the time the NaCl surrounding the void crystallized from the brine.

As NaCl accumulates on the bottom of the pond to an appreciable depth, steps are taken to fill the voids in the NaCl floor with solid material. For example, the NaCl floor may be covered with a brine which has a relatively high concentration of a dissolved salt capable of suppressing the solubility of NaCl. Many brines contain dissolved salts, notably the inorganic chlorides, which suppress the solubility of NaCl, but the most commonly available brines suitable for use in the practice of this invention are those which are relatively concentrated with respect to $MgCl_2$. By "relatively concentrated" is meant a higher concentration than exists in the brine entrained in the NaCl floor. As a result of the brine cover, NaCl deposits in the voids, thereby reducing their total volume. The mechanism responsible for this deposition of NaCl in the voids is presumed to be the molecular diffusion of $MgCl_2$ from the brine cover into the entrained brine in the floor. As the concentration of $MgCl_2$ in the entrained brine, which is saturated with respect to NaCl, increases, the permissible concentration of NaCl in the brine at saturation decreases, thereby resulting in the crystalization of NaCl. If the brine is sufficiently concentrated with respect to sulfate, hydrated magnesium sulfate will be forced out of the brine along with sodium chloride. This concurrent deposition lends additional strength to the floor.

According to certain preferred embodiments, the newly constructed pond is flooded with a brine saturated with respect to NaCl and containing $MgCl_2$ and the brine is evaporated under concentrating conditions so that the $MgCl_2$ concentration in the pond brine is always greater than the $MgCl_2$ concentration in the entrained brine. Due to this concentration gradient, $MgCl_2$ continuously diffuses from the pond brine into the entrained brine so that NaCl, and in some instances hydrated $MgSO_4$, continuously but gradually crystallizes in the voids. There results a deposit of less depth but containing fewer initial voids than results when the brine is first evaporated under non-concentrating conditions.

At the end of the evaporation season, the sodium chloride floor may be further strengthened by covering it with a brine of composition such that upon cooling magnesium sulfate tends to crystallize therefrom in the form of a hydrate, notably epsomite ($MgSO_4 \cdot 7H_2O$). In the case of brine from the Great Salt Lake it has been found that Glauber salt crystallizes upon cooling of brines containing less than about 20 moles $MgCl_2$ per thousand moles $H_2O$. At higher concentrations of $MgCl_2$ first epsomite and then lower hydrated species of $MgSO_4$ crystallize. Glauber salt adds no strength to the NaCl floor and may actually be detrimental. Epsomite and lower hydrated $MgSO_4$ species, such as $MgSO_4 \cdot 6H_2O$ and $MgSO_4 \cdot 4H_2O$, deposited in the interstices between the sodium chloride crystals, impart additional strength to the floor. Thus, if concentrated Great Salt Lake brine is used as a cover brine, it should contain sufficient concentration of $MgCl_2$ that natural diffusion results in a concentration of at least 20 moles $MgCl_2$ per thousand moles $H_2O$ in the entrained brine. By selecting a proper quantity of natural brine for the initial flooding of the pond, a brine of suitable $MgCl_2$ and $MgSO_4$ concentrations will automatically result at the end of the evaporation season and can be left in place during the winter season. Otherwise, the pond hould be drained and a suitable brine cover provided.

The cooling referred to herein and in the claims is that which results from normal fluctuations in temperature from the evaporation season to the winter season. Typically, summer brines have temperatures above 20° C., in some instances reaching temperatures as high as 35° to 40° C. for prolonged periods. Winter brine temperatures typically average at least about 10° to 20° C. cooler than summer brine temperatures, often reaching temperatures substantially below 0° C. The composition required for the sulfate-producing brine will naturally depend in some measure on the degree of temperature fluctuation in the geographical area concerned.

Various double salts of potassium, such as schoenite and kainite, strengthen the floor if they are deposited in the voids. When this invention is practiced with brines concentrated with respect to potassium, minor amounts of these potassium salts normally "salt out" in the voids along with the hydrated magnesium sulfate. The presence of potassium salts in the interstices between the NaCl crystals in the floor is regarded as desirable. Accordingly, when brines concentrated with respect to both magnesium and potassium, are available, they are ordinarily preferred. The reinforced floors of this invention may contain up to about 5 percent or more by weight potassium although lesser amounts, e.g. about 1 to about 3 percent by weight, are considered ideal.

Of course, the entrained brine must contain a sufficiently high concentration of sulfate to ensure that an $MgSO_4$ species will crystallize in the voids of the NaCl floor. If this sulfate is not present in the entrained brine at the end of the evaporation season, the brine cover should contain a high enough concentration of sulfate to provide the requisite additional sulfate to the entrained brine by diffusion after a period of contact between the floor and the cover brine. Usually, the volume of entrained brine is small compared to the volume of the brine cover. Accordingly, the $MgCl_2$ concentration of the cover brine need ordinarily be only slightly higher than the concentration which avoids the deposition of Galauber salt. In the case of concentrated brines resulting from the evaporation of brine similar to those taken from the Great Salt Lake of Utah, $MgCl_2$ concentrations in the cover brine of at least about 20 moles $MgCl_2$ per 1,000 moles $H_2O$ are generally adequate, provided the brine is saturated with respect to sulfate.

The brine cover is subjected to winter cooling, thereby causing the deposition of hydrated magnesium sulfate in the voids, or interstices, of the sodium chloride floor. The presence of the hydrated magnesium sulfate renders the floor extremely tough as compared to a typical sodium chloride floor. To avoid redissolving $MgSO_4$, the pond is drained while the weather is still cold. If it is desired to maximize the amount of hydrated $MgSO_4$ in the floor, the initial NaCl floor may be deposited under conditions which favor the development of substantial voids, e.g., under a brine with a low concentration of $MgCl_2$. The pond may then be flooded with hydrated magnesium sulfate-producing brine cover without the intermediate step of forcing NaCl from the entrained brine with $MgCl_2$.

The final step in the production of the improved floors of the present invention generally involves flooding the pond with brine which is saturated with respect to NaCl and which contains a higher concentration of $MgCl_2$ than the concentration which exists in the entrained brine. This brine should also contain a sufficiently high concetration of dissolved sulfate to prevent the redissolution of the hydrated magnesium sulfate from the sodium chloride floor. Preferably, the cover brine is saturated with respect to magnesium sulfate, at least in the vicinity of the pond floor. This flooding procedure may in some instances actually constitute the normal brine manipulation procedure for the pond during the production season. For example, brines from the Great Salt Lake which are evaporated until they are saturated with respect to kainite contain about 47 moles $MgCl_2$ per thousand moles $H_2O$ and are suitable for the production of kainite in accordance with the teachings of the aforesaid co-pending patent application Ser. No. 735,840. These same brines may be used concurrently for completing the pond floor in accordance with the present invention. Brines with higher concentrations of $MgCl_2$ are even more effective. The function of the $MgCl_2$-concentrated brine is to supply $MgCl_2$ to the brine entrained by the salt floor, thereby forcing additional NaCl out of the entrained brine to fill the voids in the floor. In this fashion, there is produced a strong, dense, compact floor, substantially free from voids and capable of supporting heavy harvesting equipment.

Over the course of several years of use, the floors of this invention tend to become progressively stronger. Because the floors are normally covered by brines which are concentrated to saturation or near saturation with respect to one or more of NaCl, $MgSO_4$ and potassium mineral species, any remaining voids in the floor tend to gradually fill. In addition, the hydrated magnesium sulfate in the floor tends to convert gradually to lower hydrate forms. Eventually, the floor loses its crystalline appearance and resembles an agglomerate mass such as concrete with the hydrated magnesium sulfate of the floor corresponding to cement and the NaCl of the floor corresponding to aggregate. The sodium chloride "aggregate" no longer appears as clearly defined crystals but rather as gravel-like inclusion lacking discrete crystal surfaces. If potassium double salts are present in the floor, they are generally present in the form of inclusions between the sodium chloride particles.

The composition of the floors of this invention is unique. Although the chemical analysis and mineral composition of a particular floor may vary from year to year, sutiable floors will contain, exclusive of entrained brine and on a weight-percent basis, about 15 to about 40 percent sodium, about 2 to about 7 percent magnesium, about 20 to about 50 percent chlorine, about 8 to about 25 percent sulfate, and up to about 7 percent potassium. The sodium is present substantially entirely as halite. Any potassium present is substantially all in the form of double salts of magnesium sulfate, such as kainite, schoenite, and leonite, although occasionally some potassium may be present in other forms, e.g., as sylvite or carnallite. The magnesium which is not present in the form of these double salts is present as a hydrated magnesium sulfate, usually, but not necessarily, epsomite. An ideal floor contains about 2 percent potassium; about 25 percent sodium; about 3 percent magnesium; about 12 percent sulfate; and sufficient chloride to satisfy the requirements of the halite and potassium minerals present. The normal range of chemical analyses of suitable floors is about 1 to about 3 percent potassium; about 20 to about 30 percent sodium; about 2 to about 4 percent magnesium; about 35 to about 45 percent chloride; and about 9 to about 15 percent sulfate. Other constituents may be present in minor amounts, generally totaling less than about 1 percent, but they have little effect on the strength characteristics of the floor.

Exclusive of entrainment, the floors of this invention contain at least about 50 and preferably between about 60 and about 80 percent by weight halite in the form of ill-defined crystals. The size of the crystals is a factor in determining the ultimate strength of the floor but is not critical to the invention provided the crystals are arranged in such fashion as to leave a substantial percent, at least about 10, preferably about 15 to about 30 and occasionally as much as about 40 volume-percent of interstitial volume surrounding the crystals throughout the floor. Generally, larger crystals, e.g., pea-size crystals, provide stronger floors than do very fine crystals. In any event, the floor will be many times thicker than the average diameter of the halite crystals. A vertical line through even a thin floor would pass adjacent at least 100, usually several hundred, halite crystals. The interstitial volume between the halite crystals is substantially filled with sulfate-containing minerals, principally hydrated $MgSO_4$ but including in some embodiments potassium-containing double salts of $MgSO_4$. The interstitial volume may include some other minerals, notably potassium and magnesium salts, and some entrained brine, particularly when the floor is young, i.e. within the first few years of its deposition. Although the crystal structure of the sulfate minerals is not normally apparent to the naked eye, it has been found that stronger floors result when the $MgSO_4$ is deposited under conditions which favor the growth of larger crystals. The amount of entrainment and mineral impurities tolerable in a floor depends upon the volume-percent of the interstitial volume. In general, the interstitial volume should be at least about 70 percent filled with sulfate minerals. As the floors age in use, the interstitial volume may decrease somewhat because of the deposition of additional halite and will often tend to fill with additional sulfate minerals. The density of the floor should be above about 1.75, preferably above about 1.8 and will rarely exceed about 2.1 grams per cubic centimeter.

DESCRIPTION OF THE DRAWINGS

In the drawing, which illustrates the best mode presently contemplated for carrying out the invention.

DESCRIPTION OF THE ILLUSTRATED EMBODIMENTS

Figure 1:
FIGS. 1 through 7 are diagrammatic views of a pond showing the sequence of brine manipulations taught by the present invention.
Figure 2:
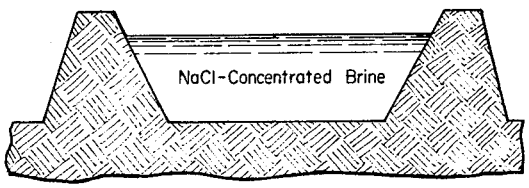
Figure 3:
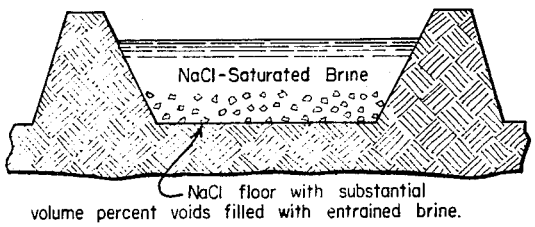
Figure 4:
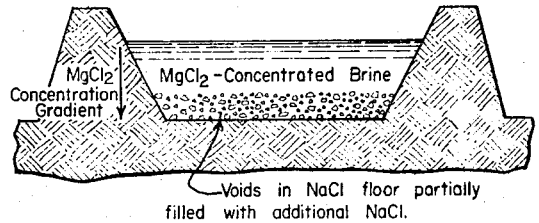

As the first step of the illustrated procedure, a pond is constructed in the vicinity of a natural-brine source (FIG. 1). The bottom and side dikes of the pond are of clay. The pond is first flooded with NaCl-concentrated brine (FIG. 2). Brine flow is stopped, and the brine is allowed to evaporate, becoming more concentrated with respect to magnesium chloride as it drops a sodium chloride crystal crop into the bottom of the pond (FIG. 3). This crystal crop comprises individual crystals with interstitial spaces between the crystals. Accordingly, the floor formed thereby on the bottom of the pond contains a high volume-percent of voids filled with entrained brine. Eventually, $MgCl_2$ diffuses from the pond brine into the brine entrained in the sodium chloride floor (FIG. 4), thereby forcing additional NaCl from the entrained brine.

Figure 5:
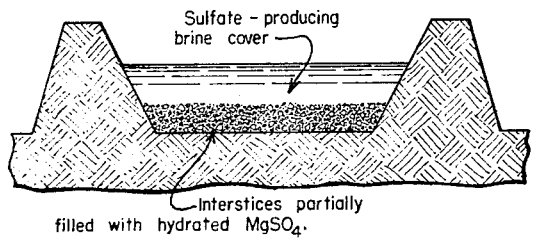
Figure 6:
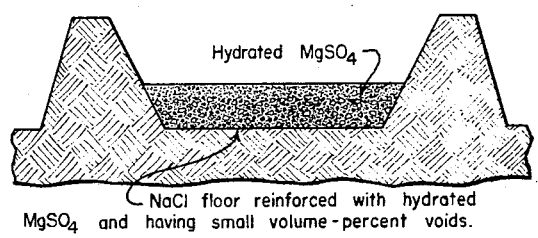

As illustrated by FIGS. 5 and 6, magnesium sulfate-producing brine, i.e., brine concentrated with respect to magnesium chloride, is provided as a cover for the NaCl floor during the winter season. The brine cover is subjected to winter cooling and deposits hydrated magnesium sulfate in the interstices of the floor and on top of the floor. The brine cover is removed after winter cooling (FIG. 6), leaving behind an NaCl floor, reinforced with interstitial hydrated $MgSO_4$ and having a greatly reduced volume-percent of voids. Precipitation during the remainder of the winter season may redissolve some of the $MgSO_4$ on top of the floor but usually doesn't affect the $MgSO_4$ deposited in the voids.

Figure 7:
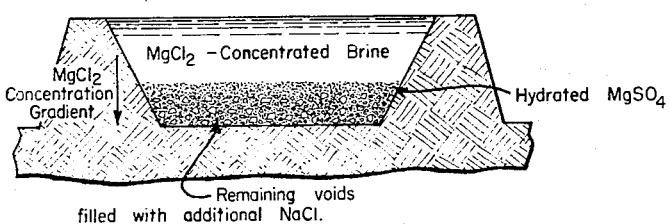

The pond is next flooded with brine saturated with respect to NaCl but more concentrated with respect to $MgCl_2$ than is the brine entrained in the floor (FIG. 7). There eventually results a substantially void-free floor, presumably because sodium chloride is "salted out" of the entrained brine due to the influence of the $MgCl_2$-concentrated pond brine. The $MgSO_4$ hydrate is thus encased in the NaCl floor and is insulated from the solvent action of brines subsequently stored in the pond.

The aforedescribed procedure will be better understood with reference to the following specific examples:

EXAMPLE I

A pond is constructed in the vicinity of the Great Salt Lake of Utah. The floor and walls of the pond are of clay indigenous to the area. The pond is flooded to a depth of approximately 28 inches with brine taken from the Great Salt Lake of Utah, having composition substantially as designated A in Table 1. The brine is allowed to evaporate during an evaporation season until it attains a composition substantially as designated B in Table 1. At the end of the evaporation season, this brine is permitted to remain in place over the winter and is subjected to winter cooling. At the coldest part of the winter, the pond is drained. The drained pond is flooded to a depth of approximately 12 inches with brine having a composition substantially as designated C in Table 1. After about 90 days, the resulting floor is substantially void free, containing only about 5 volume-percent entrained brine, and consists principally of NaCl with approximately 15 volume-percent interstitial hydrated $MgSO_4$ principally epsomite. The floor also contains about 2 percent by weight potassium in the form of double salts such as schoenite and kainite. The floor is approximately 6 inches thick and is suitable for the support of heavy equipment.

TABLE 1.—BRINE COMPOSITIONS (MOLES PER 1,000 MOLES $H_2O$)

| | $MgSO_4$ | $MgCl_2$ | KCl | NaCl |
|---|---|---|---|---|
| A..... Initial brine..................... | 5.76 | 6.27 | 4.24 | 86 |
| B..... Winter brine cover............. | 20 | 30 | 16 | 36 |
| C..... $MgCl_2$—concentrated brine.. | 20 | 47 | 15.4 | 18 |
| D..... Effluent brine................... | 11.1 | 12.1 | 8.2 | 71 |

EXAMPLE II

A salt floor is produced by manipulating brine of composition designated A in the fashion heretofore relied upon for the production of sodium chloride floors in solar evaporation ponds. Thus, such a brine is continuously pumped into a solar pond and subjected to evaporation. Brine effluent of composition substantially as designated D in Table 1 is continuously withdrawn from the pond. A crystal layer containing essentially pure NaCl and about 40 volume percent voids is deposited.

EXAMPLE III

A newly excavated pond is flooded with brine of composition designated A in Table 1. The brine is subjected to evaporation under non-concentrating conditions, i.e., with continuous flow which maintains a depth of about 12 inches of brine in the pond. Brine effluent from the pond has approximately the composition designated D in Table 1. At the close of the evaporation season, about 150 days after the initial flooding, a layer of NaCl crystals approximately 8 inches thick has deposited on the bottom of the pond. This NaCl layer contains approximately 40 volume-percent voids. The pond is drained and re-flooded with brine of approximately the composition designated B in Table 1. This brine is held in the pond during the winter until the coldest part of the season, about January 1, when the pond is again drained. The volume-percent of voids remaining in the floor is about 30, the remainder of the volume being filled primarily with $MgSO_4 \cdot 7H_2O$.

A layer of approximately 2 inches of $MgSO_4 \cdot 7H_2O$ remains on top of the NaCl floor. A minor portion of the $MgSO_4 \cdot 7H_2O$ is redissolved by winter precipitation. At the start of the next evaporation season, the pond is drained of accumulated precipitation and is reflooded with brine having composition substantially as designated C in Table 1. At the end of the evaporation season, the floor of the pond is substantialy void free, i.e., contains less than about 10 volume-percent voids. A kainite crystal crop has deposited on top of the floor and is easily harvested by scrapers running on top of the floor after the pond is drained.

EXAMPLE IV

Several pond floors were produced in individual test ponds by evaporating brines taken from the Great Salt Lake of Utah. One such pond floor, designated A in the following tables was produced by procedures such as those described in Example II and consisted essentially of halite. Four other floors, designated B-1, B-2, B-3 and B-4, respectively, were produced under conditions described herein for producing strong, compact, dense floors. Because the test ponds were used for tests which required the brines to be manipulated in various ways, the ponds were such as described by Example I and non-concentrating conditions such as described by Example III. In any event, operation of the ponds was handled in such a fashion that the brines in contact with the floors were ultimately quite concentrated with respect to $MgCl_2$, generally containing in excess of about 45 moles $MgCl_2$ per 1000 moles $H_2O$ and in some instances in excess of about 65 moles $MgCl_2$ per 1000 moles $H_2O$.

Table 2 reports the chemical analyses and Table 3 reports the mineral compositions of the several floors, exclusive of entrainment, which amounted to about 13 percent by weight.

TABLE 2

| | Chemical analyses (weight percent) | | | | | |
|---|---|---|---|---|---|---|
| | K | Na | Mg | Cl | SO₄ | H₂O |
| Pond floor: | | | | | | |
| A | | 39.00 | | 61.00 | | |
| B-1 | 1.86 | 26.57 | 2.73 | 41.42 | 11.99 | 15.43 |
| B-2 | 1.77 | 22.26 | 3.78 | 35.69 | 15.10 | 21.40 |
| B-3 | 1.56 | 23.80 | 3.47 | 38.71 | 12.75 | 19.70 |
| B-4 | 1.12 | 27.95 | 2.23 | 44.60 | 8.94 | 15.15 |

TABLE 3

| | Mineral compositions (weight percent) | | | |
|---|---|---|---|---|
| | Halite | Epsomite | Schoenite | Kainite |
| Pond floor: | | | | |
| A | 100.00 | | | |
| B-1 | 70.00 | 20.00 | 9.42 | 0.24 |
| B-2 | 60.76 | 29.58 | 7.97 | 1.56 |
| B-3 | 66.14 | 25.39 | 5.24 | 3.42 |
| B-4 | 76.72 | 16.96 | 5.15 | 0.00 |

Several cylindrical samples, 18 inches in diameter, were taken from scattered locations in each pond. Each sample included the full thickness of the pond floor. Each cylinder was then trimmed with a saw, leaving a rectangular block measuring 10 inches by 5 inches by the full thickness of the floor. The blocks were each cut into test specimens measuring 2 inches by 2 inches by 4 inches, the long dimension being cut normal to the floor surface. Each specimen was sanded as required to ensure that opposing faces were parallel. In some instances, it was not feasible to provide specimens of precisely the desired size, in which event specimens of somewhat smaller lengths were prepared as indicated in Table 4. The specimens were conditioned for 24 hours at 70° F. and tested at the same temperature.

The samples were tested by a modification of ASTM procedures customarily used to test flexible paving compounds. The test consisted of applying a compressive force to the samples at a constant strain rate. The resulting stresses were plotted against strain and the yield load and modulus were determined from the plot in conventional manner. Details of the test and results are reported in Table 4.

TABLE 4

| Pond floor | Floor thickness in inches | Strain rate in inches per inch per minute | Specimen size in inches | Number of specimens tested | Yield load, p.s.i. (average) | Modulus [1] in p.s.i. per inch per inch (average) |
|---|---|---|---|---|---|---|
| A [2] | 8 | | | | 0 | 0 |
| B-1 | 6 | 0.005 | 2 x 2 x 4 | 8 | 628 | 27,238 |
| B-2 | 6 | 0.005 | 2 x 2 x 4 | 4 | 390 | 18,775 |
| B-3 | 6 | 0.0057 | 2 x 2 x 3½ | 6 | 348 | 14,925 |
| B-4 | 12 | 0.0053 | 2 x 2 x 3¾ | 3 | 487 | 17,967 |

[1] Yield load divided by the strain at yield load.
[2] The floor lacked the necessary strength to prepare test specimens.

Other test pond floors which are deposited under brines less concentrated with respect to $MgCl_2$, although far superior to halite floors, had less strength than those reported in Table 3. By way of comparison, specimens of such floors generally failed under testing at loads below 250 p.s.i. and had moduli of less than about 10,000. The strength of such floors could be improved considerably by contacting them with appropriate brines in accordance with this invention during a subsequent evaporation season.

EXAMPLE V

The pond floors reported in Table 4 were also tested in accordance with the procedure of ASTM D 1196-64, adopted 1957, as revised in 1964. The halite floor (pond A) was found to fail under a load of about 20 p.s.i. and had a deflection of about 0.7 inch at failure. By contrast, typical floors produced in accordance with this invention did not fail and had deflections of only about 0.3 inch, even at loads of about 60 p.s.i. The test results would be expected to show even greater differences between the halite floor and the floors of this invention if the test ponds had remained in operation for longer periods.

Reference herein to details of certain specific embodiments is not intended to limit the scope of the invention except insofar as these details are recited in the appended claims. Many modifications within the legitimate scope of the invention will be suggested to those skilled in the art by the present disclosure. For example, it should be understood that the invention is useful for the production of suitable floors for ponds other than those employed for the recovery of potassium salts. A wide variety of brine compositions is suitable for use in the practice of this invention. Those skilled in the art will be guided by this disclosure, in the selection of suitable brines.

We claim:

1. A composition of matter comprising at least about 60 volume-percent halite crystals sized and arranged in a matrix as crystallized from solution to include up to about 40 volume-percent interstitial volume between said halite crystals and $MgSO_4$-containing minerals deposited in place to substantially fill said interstitial volume; said composition containing between about 8 and about 25 percent by weight sulfate and 1 to about 7 weight percent potassium both exclusive of entrained brine, and having sufficient strength to withstand loads of at least 250 p.s.i. when tested in accordance with the procedures of Example IV of the specification.

2. A composition according to claim 1 containing about 15 to about 30 volume-percent interstitial volume which volume is at least 70 percent filled with sulfate-containing minerals selected from the group consisting of hydrated $MgSO_4$ and potassium-containing double salts of $MgSO_4$.

3. A composition according to claim 2 embodied as a solar evaporation pond floor with a density of at least about 1.75 grams per cubic centimeter.

4. A pond floor according to claim 3 with a density of about 1.8 to about 2.1 grams per cubic centimeter.

5. A pond floor according to claim 4 containing about 60 to about 80 percent by weight halite exclusive of entrained brine.

6. A pond floor according to claim 5 containing about 9 to about 15 weight-percent sulfate exclusive of entrained brine.

7. A pond floor according to claim 6 containing about 1 to about 3 weight-percent potassium exclusive of entrained brine.

8. A pond floor according to claim 7 wherein the potassium is substantially all present as schoenite, kainite, or a mixture thereof.

9. A composition of matter according to claim 2 with a density of about 1.8 to about 2.1 grams per cubic centimeter and containing, exclusive of entrainment, about 60 to about 80 percent by weight halite; about 8 to about 25 percent by weight sulfate; and about 2 to about 7 percent by weight potassium, the magnesium being present as magnesium sulfate, and the potassium being present as double salts of magnesium sulfate.

10. A composition of matter according to claim 9 containing, by weight, about 1 to about 3 percent potassium, about 20 to about 30 percent sodium, about 2 to about 4 percent magnesium, about 35 to about 45 percent chloride, and about 9 to about 15 percent sulfate.

References Cited

UNITED STATES PATENTS

| | | | |
|---|---|---|---|
| 1,487,046 | 3/1924 | Burnhan | 23—298 |
| 2,532,924 | 12/1950 | Lesense | 159—49 |

OTHER REFERENCES

Chem. Abstrac., 45:9229g, 1951.

THEODORE MORRIS, Primary Examiner

U.S. Cl. X.R.

23—300, 304; 159—49

UNITED STATES PATENT OFFICE
CERTIFICATE OF CORRECTION

Patent No. 3,667,980                     Dated June 6, 1972

Inventor(s) Ulrich E. G. Neitzel and David S. Butts

It is certified that error appears in the above-identified patent and that said Letters Patent are hereby corrected as shown below:

Col. 1, line 51, change "crop" to --crops.--; delete "is being harvested, i.e., the 'harvest pond.'" and insert --The crystal crops are then harvested, either--.

Col. 3, line 37, change "houd" to --should--.

Col. 4, line 2, change "Galauber" to --Glauber--;
line 3, change "brine" to --brines--;
line 28, change "concetration" to --concentration--;
line 64, change "inclusion" to --inclusions--;
line 72, change "sutiable" to --suitable--.

Col. 7, line 54, after "were" insert --operated intermittently under concentrating conditions--;
line 75, change "1.12" to --1.13--.

Signed and sealed this 21st day of November 1972.

(SEAL)
Attest:

ELWARD M. FLETCHER, JR.
Attesting Officer

ROBERT GOTTSCHALK
Commissioner of Patents